Fig. 2

INVENTOR
Marc Alfred

Oct. 13, 1964 M. ALFRED 3,152,960
CONTROL DEVICE FOR CONTROL AND SAFETY RODS FOR NUCLEAR REACTORS
Filed Jan. 13, 1961 12 Sheets-Sheet 3

INVENTOR
MARC ALFRED
BY Bacon & Thomas
ATTORNEYS

INVENTOR
MARC ALFRED
BY
Bacon & Thomas
ATTORNEYS 3,152,960
CONTROL DEVICE FOR CONTROL AND SAFETY
RODS FOR NUCLEAR REACTORS
Marc Alfred, 20 Rue de Villiers, Levallois-Perret, France
Filed Jan. 13, 1961, Ser. No. 82,602
5 Claims. (Cl. 176—36)

The present invention relates to the controlling of control and safety rods of nuclear reactors and relates particularly to a controlling device for such rods intended for use with a pressurized water reactor.

It is known to actuate reactor control and safety rods by means of screw mechanisms which effect longitudinal displacements of the rods, the rotational movement of motors controlled, for example, by the variations in the reactivity of the reactor and appropriate mechanisms, acting in an emergency to release the rods so that they slide freely or to project the rods into the interior of the core of the reactor.

These mechanisms which can set in motion A.C. low frequency electric motors are very suitable in certain cases but they cannot be used when it is a matter of equipped reactors of the pressurised water type and when these reactors are installed, for example, on board ship. It is then necessary to solve important problems particularly related to the requirements of the resistance to pressure of the casing of the reactor and of its allied members and to the functioning of mechanisms in movement in a fluid under pressure at a high temperature and which can constitute an aggresive agent. On the other hand the devices must be able to withstand, without damage and without disturbance in their function, accelerations of the order of 30g and vibrations of a frequency of the order of 30 cycles per second.

The invention has as its object a control device for control and safety rods for nuclear reactors which solves the above problem.

This device is essentially characterised in that it compreses a longitudinally movable hollow screw in engagement with a nut integral with the rotor of a first electric motor and carrying by means of a spring and pin expulsion system, the rod to be controlled, a pin sliding in the hollow screw and connected for rotation with the latter with the rotor of a second motor, this shaft being held by a spring in an angular position corresponding to the inoperative state of the said expulsion system and capable of being taken into a position corresponding to the actuation of the said system by rotation of the rotor of this second motor, the two motors being disposed one above the other in a hermetically sealed housing attached to the tank of the reactor and enclosing a system of current-contacts, a system indicative of the position of the rod and a thermal barrier, each of the two motors being of the reluctance type and fed from rotating commutators respectively controlled in the case of the first motor by a motor controlled by the parameter functions of the reactivity of the reactor, and in the case of the second motor by a system of electromagnets and sliding core, releasing rotating commutators ensuring the maintenance, release and normal operation couplings of the two motors.

The device according to the invention which deals with the control of the rod, is intended to be used at the same time as other similar devices. A reactor is in fact controlled by an assembly of control rods, which may be distributed in several groups. As for the translation motors, each one of which is indicated above by "first motor," when the reactivity of the reactor is constant and when it is not desired to act upon them, they are tapped off in series and each is therefore fed at a reduced voltage. Each motor is thus fed with a voltage which is sufficient to hold its rotor in a fixed position.

When the position of a rod must be modified, the corresponding release commutator modifies the feed coupling of the translation motor which is fed with the full voltage for normal operation. It is the same for the "second motors" or safety motors which though normally fed in series develop sufficient torque to compress the spring of the control shaft of the rod expulsion system. The break-off in the supply to one of these motors brings about the release of this spring and therefore the operation of the expulsion system for the corresponding rod.

Other characteristics and advantages of the invention will be seen from the following description, relating to a particular embodiment and from the attached drawings, in which.

Figure 1:
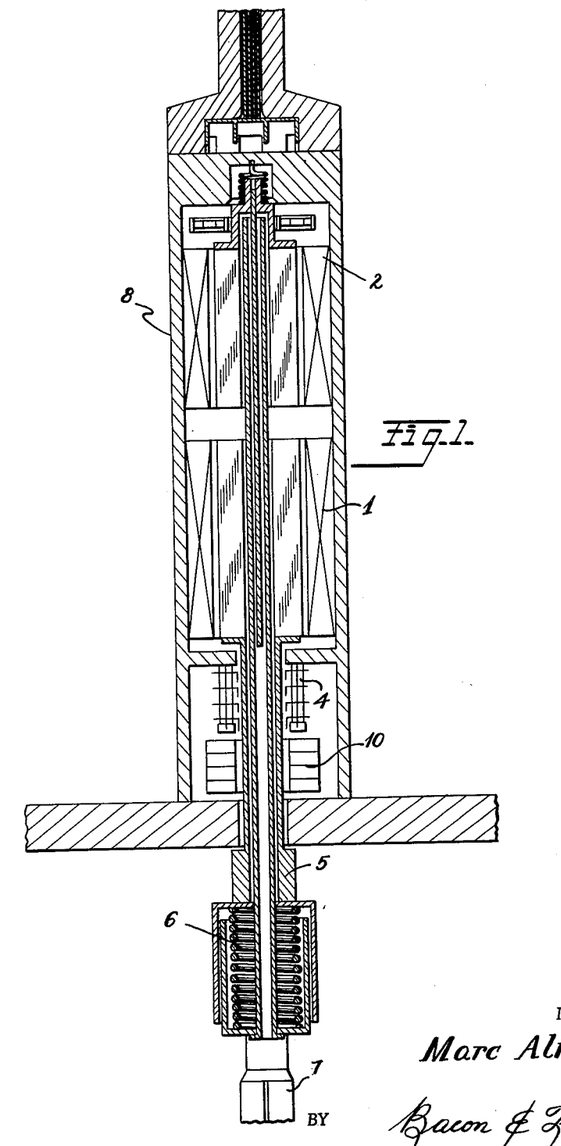
FIGURE 1 diagrammatically shows in vertical section the assembly of the translation and safety motors for one rod.

In FIGURE 1 is seen the assembly of the translation and safety motors relating to a rod mounted on a tank of the reactor.

The translation motor is represented at 1 and the safety motor at 2. All the electrical connections are made with the help of a current-contact system 3. A thermal barrier 4 is arranged below the motors. At 5 is shown a turning nut device controlling the longitudinal displacement of the rod 7 and at 6 a spring and turning pin expulsion system. The motors are enclosed in a hermetic housing 8, integral with the tank 9 of the reactor. At 10 is shown the "holding" part of the system for measuring the position of the rod.

Figure 2:
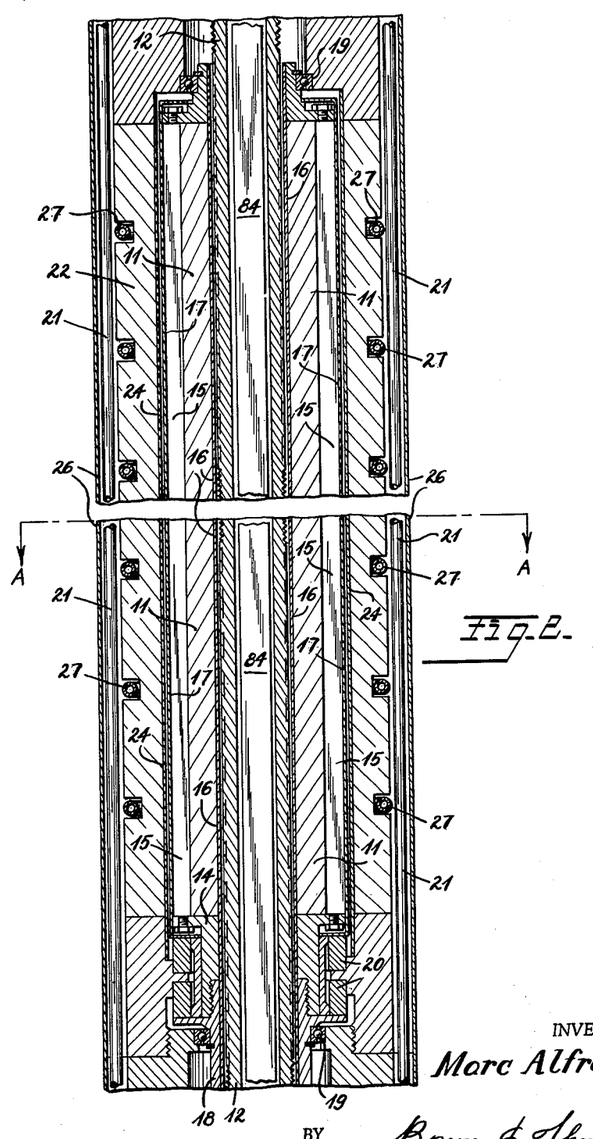
FIGURE 2 is a view in longitudinal section on a larger scale of a translation motor.
Figure 3:
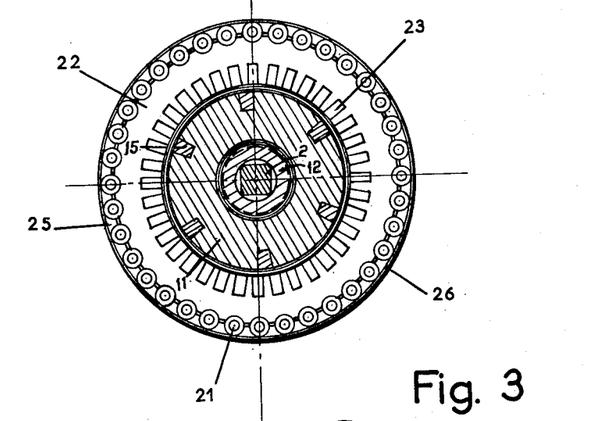
FIGURE 3 is a section through this motor along the lines A—A of FIGURE 2.

The rod translation motor is represented in FIGURE 2 in longitudinal section and in FIGURE 3 in diametrical section along the line A—A of FIGURE 2; it is a D.C. reluctance motor. Its power is about 1 kw. and the torque developed is 1.5 m. kg.; the starting torque is about 10 m. kg. The normal speed is 300 revolutions per minute which corresponds to a rod speed of 5 centimetres per second but, if it is necessary rapidly to insert the rod, its speed can attain 3000 r.p.m., which will give to the rod a speed of 50 centimetres per second. The rotor consists of a "Ticonal" 6-pole magnet 11. It is hollow in order to allow the passage of the rod control screw 12. The magnet is held between two supports 13 and 14 by means of six non-magnetic stainless steel stays 15. It is lined on the inside by a jacket 16 of non-magnetic stainless steel of a thickness of 0.5 millimetres and on the outside by a jacket 17 of "Inconel" of the same thickness. The rotor is integral with a bush 18 at the end of which is mounted the turning nut 5 situated beneath the wall 9 of the tank of the reactor. The rotor is supported by two ball bearings 19 and two ball stops 20, cooled by the cooling circuit 21. The two stops are situated near each other in order to avoid the harmful effects of expansion.

The stator 22 comprises a laminated magnetic circuit and thirty-six coils 23 located in thirty-six slots. Each coil occupies half of a slot, each tooth and coil assembly behaving like a small electromagnet. The hermetic state of the stator is obtained by means of a jacket 24 of "Inconel" which is 0.5 millimetre thick. The air gap is 1 millimetre.

The resistance to pressure, which can reach 150 kilograms per square centimetre for the fluid contained in the casing of the reactor, is ensured by the jacket 24, which is supported on the plates of the stator which are held in position by the cooling tubes 21 of an exterior diameter of 10 millimetres and of an internal diameter of 6 millimetres, which are made of stainless steel and are connected together by struts for reinforcement of the mechanical resistance, said struts being welded on after protecting the plates of the stator by asbestos. The gaps 25 between the tubes are used for the passage of the motor conductors and the conductors connected to the rod-position controlling members. A plate 26 protects the conductors which are insulated by siliconised asbestos for example.

The cooling circuit constituted by the tubes 21 is common to the translation motor, the safety motor and to the devices for measuring and optically controlling the position of the rod. The plates of the stator are mounted in groups separated by cooling rings 27. The cooling water flows successively through the tubes 21, changing direction between each tube, and the circulation of water in the rings 27 is effected by using the loss of head between two points of the circuit, one situated on a water feeding tube and the other on a water discharge tube.

Figure 4:
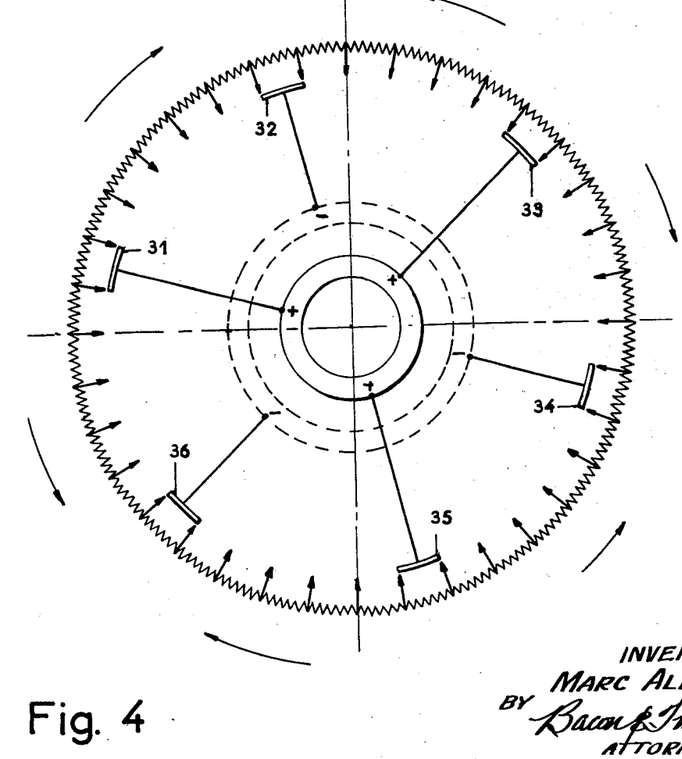
FIGURE 4 shows diagrammatically the method of feeding the stator winding of the translation motor.

The stator winding of the translation motor 1 consists of prefabricated coils, mounted in series. FIGURE 4 shows a winding diagram and supply therefor. The thirty-six coils constituting the winding have their ends led out and connected respectively by brushes, to the thirty-six rings 28 of the rotating commutator 29 shown in FIGURE 6. Each of the rings 28 is connected to one lamination of the collector 30. Six brushes 31, 32, 33, 34, 35 and 36, which are angularly equidistant rub on the collector 30. One can assume, for example, that the brushes 31, 33, 35 have a positive sign and the brushes 32, 34, 36 have a negative sign. The brushes are respectively connected to brushes 37, 38, 39, 40, 41, 42 carrying on the laminations of a second collector 43 shown in two parts on FIGURE 5 for the sake of clarity, which has a second line of brushes 44, 45, 46, 47, 48, 49 aligned with the first and through which supply takes place. The collector 43 has seventy-two laminations. Its purpose is to suppress the feed supply to the stator winding when the brushes 31–36 are each in contact with a single lamination of the collector 30; the brushes 37 to 42 are then in contact with the insulating laminations of the collector 43. The ratchet device 51 (FIGURE 6) prevents the stopping of the commutator 29 in positions corresponding to the non-feeding of the stator winding. It may be seen from FIGURES 4 and 5 that the feeding of the stator of the translation motor takes place from the brushes 44 to 49 across the assembly of the commutator 29. The brushes 31 to 36 each short circuit a coil of the stator winding and the circulation of the current takes place, as shown in FIGURE 4. The rotor is oriented in such a way that the direction of the axis of the six poles of the rotor coincide with the mean direction of the fields created by the stator coils.

Figures 6, 6A, 16:
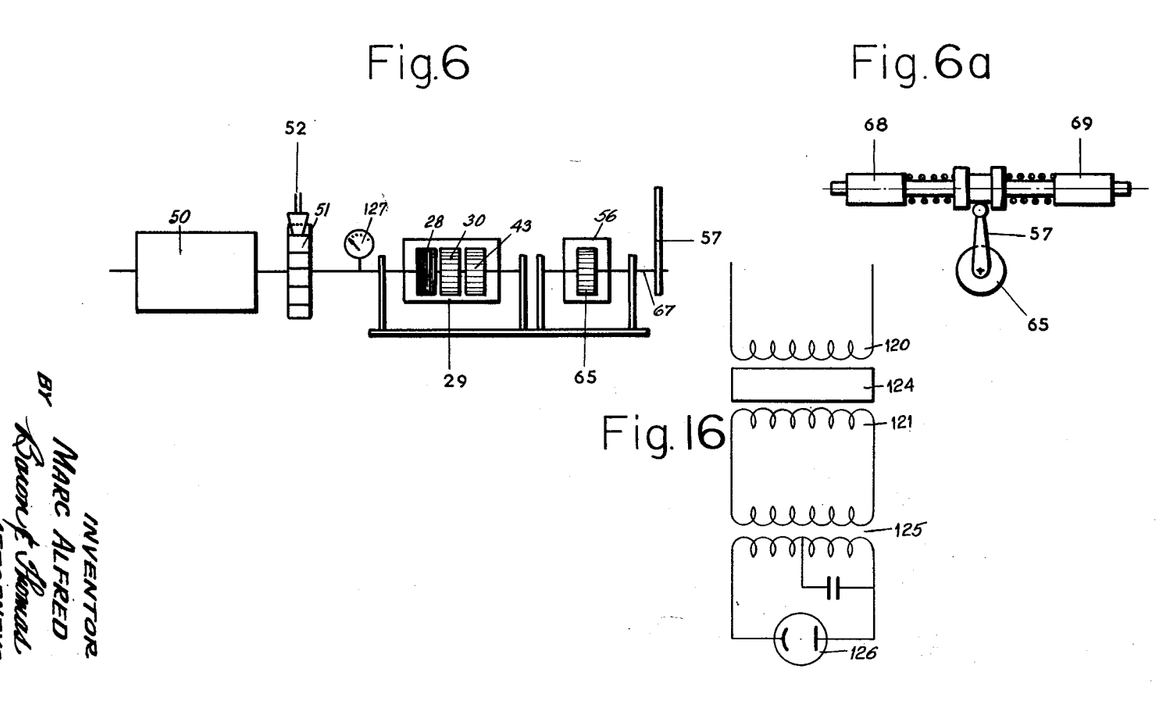
FIGURE 6 shows diagrammatically the mechanical mounting and the rotating supply commutator of the translation motor and of the rotating release commutator of this motor.
FIG. 6a schematically shows a structural detail of a portion of FIG. 6.
FIGURE 16 is a diagram of the optical control system of the end of the high or low travel of the rod.

The feeding commutator 29 of the translation motor is driven by a two-phase motor 50 fed for example at 110 volts at 50 cycles per second. A ratchet mechanism 51 prevents the stoppage of the motor in a position which would correspond to the release position of the release commutator. This ratchet device controls two microcontacts 52 acting on the feed of the electromagnets of the release rotating commutator. The assembly of the feeding circuit of these electromagnets including the microcontacts 52 is completely conventional and constitutes a locking circuit.

Figure 7:
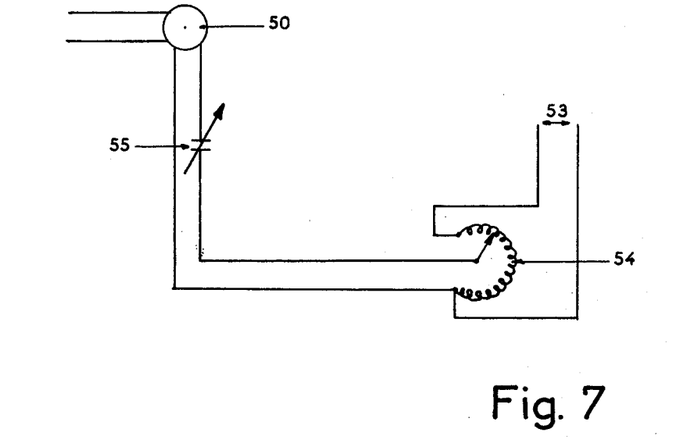
FIGURE 7 is a diagram showing the principle of the control.

The motor 50 can be connected for example to a control circuit such as that diagrammatically shown in FIGURE 7. The reaction interval signal is applied at 53 to the input of an annular transforming potentiometer 54, the position of the slide of which is a function of that derived from the gap signal in relation to the time that is to say of the speed of variation of the signal. Beyond the potentiometer is located a variable capacitance 55, the value of which is a function of the acceleration of the variation of the gap signal and of the direction of this variation. The signal applied to the motor 50 is therefore previously modified in functioning of the direction of the speed and of the acceleration of the variation of the reactivity. Of course, this control of principle is applied by any appropriate means allowing for example the regulation of the operating cycle of the reactor.

Figure 8:
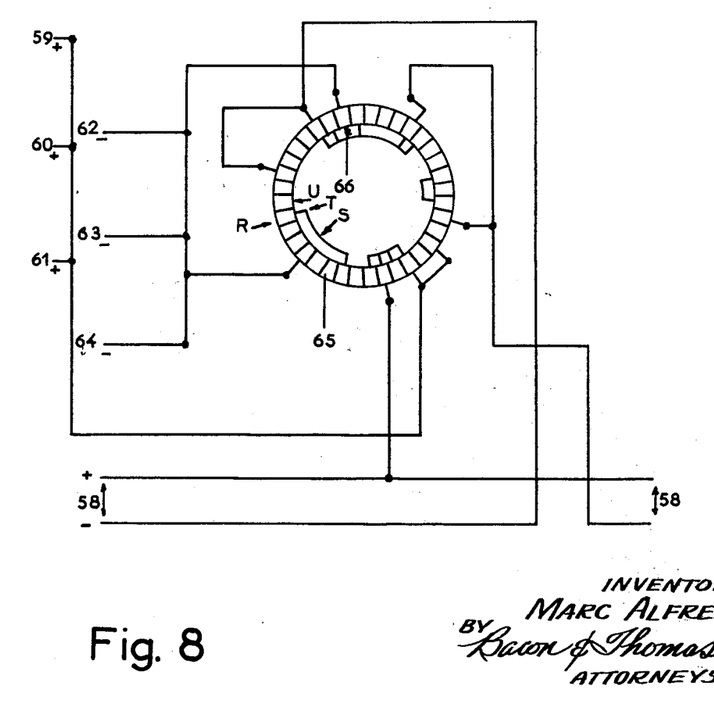
FIGURE 8 shows the electrical mounting of the collector of the release commutator of the translation motor.
Figure 9:
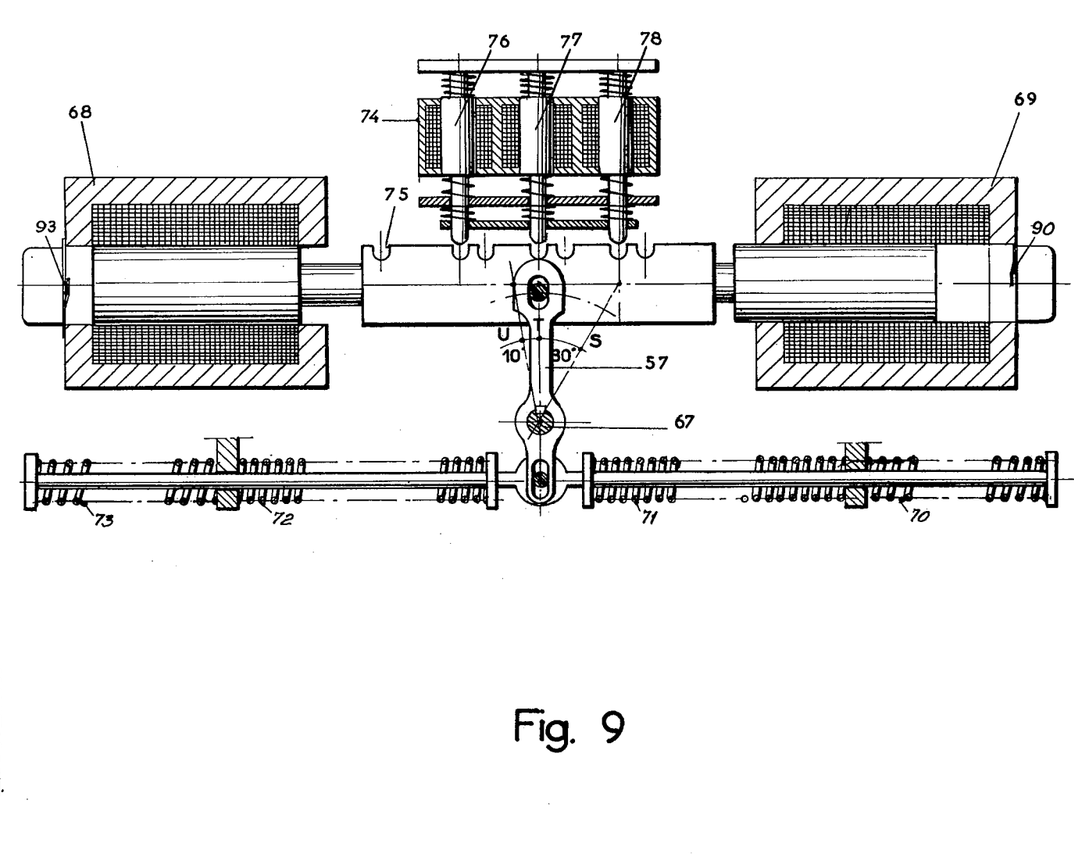
FIGURE 9 shows the electromechanical control of the release commutator of the translation motor.

FIGURE 8 shows the release rotating commutator shown at 56 in FIGURE 6 and controlled by means of a lever arm 57 by the system of electromagnets shown in FIGURE 9 and shown in principle in FIGURE 6. The feed of the translation motor 1 is effected from an appropriate source of D.C. coming from a circuit 58. All the translation motors of the installation, such as the motor 1 are tapped off, one after the other on to the circuit 58, as shown in FIGURE 8 for motor 1.

Figure 5:
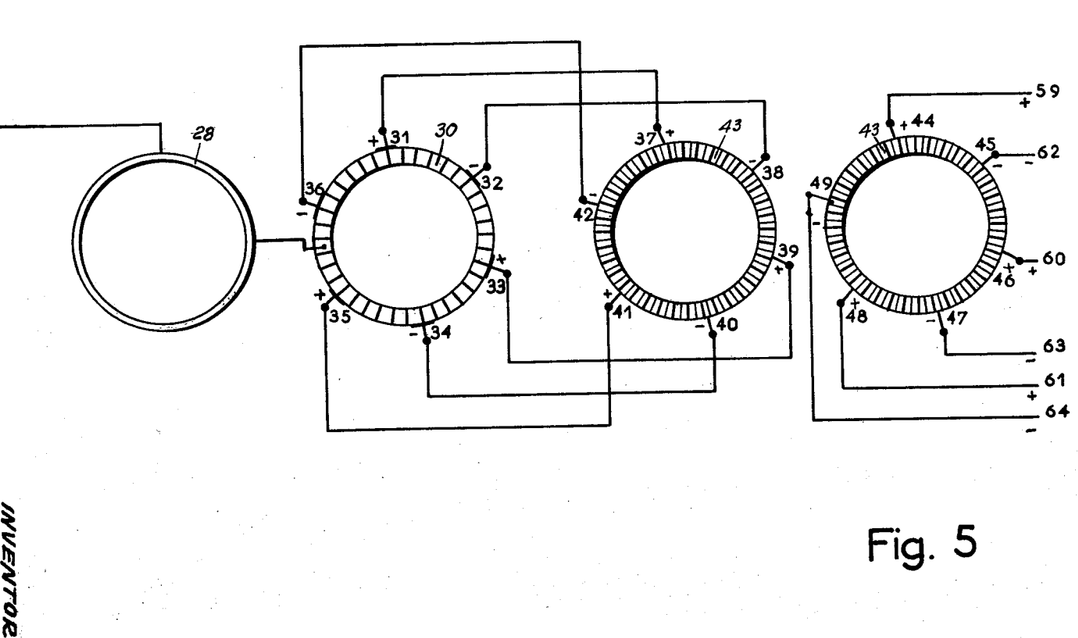
FIGURE 5 diagrammatically shows the electrical mounting of the rotating supply commutator of the translation motor.

From the circuit 58, the feed takes place by means of the release commutator 56 over the conductors 59, 60 and 61 respectively connected to the brushes 44, 46 and 48 of the commutator 29 shown in FIGURE 5 and the conductors 62, 63 and 64 connected respectively to the brushes 45, 47 and 49 of the commutator 29. The collector 65 of the commutator 56, which is integral in its rotation with the lever arm 57 can occupy three positions. These three positions are marked in FIGURE 8 by the three arrows S, T, U coming respectively in front of the fixed arrow R. Position T is the "release" position; it corresponds to the introduction of a resistance 66 in the circuit of the motor; the "normal operation" position U corresponds to the feeding of the motor with the full voltage; as for the "holding" position S, it corresponds to the feeding under reduced tension which is sufficient to immobilise the motor rotor. In this last position all the similar motors of the installation are tapped off in series.

Figure 10:
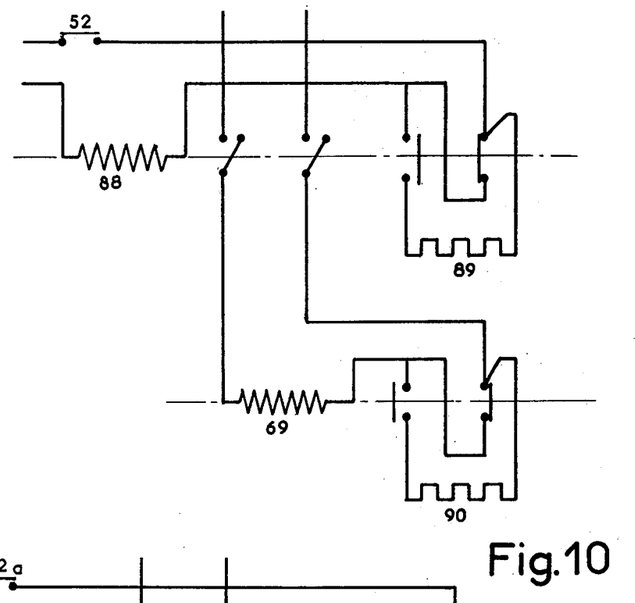
FIGURE 10 is a diagram showing the principle of the circuit of the "release" electromagnet of the control shown in FIGURE 9.

FIGURE 9 shows the control system and the release commutator 56. The axis 67 of the collector 65 is integral with the lever arm 57. The latter turns when the sliding core of one of the two electromagnets 68 and 69 is attracted. When these electromagnets are not fed, the lever arm 57 is brought back and held in the median position by a return system comprising four springs 70, 71, 72 and 73 which eliminate errors in the zero position due to variations in temperature. By means of a conventional locking circuit, the position of the cores of the electromagnets, that is to say, that of the lever arm 57 is maintained by a bolt 74 acting together with slots 75 and having three electromagnets 76, 77 and 78. The control circuit of the electromagnet 69 is shown in FIGURE 10 and that of the electromagnet 68 in FIGURE 11.

Figure 11:
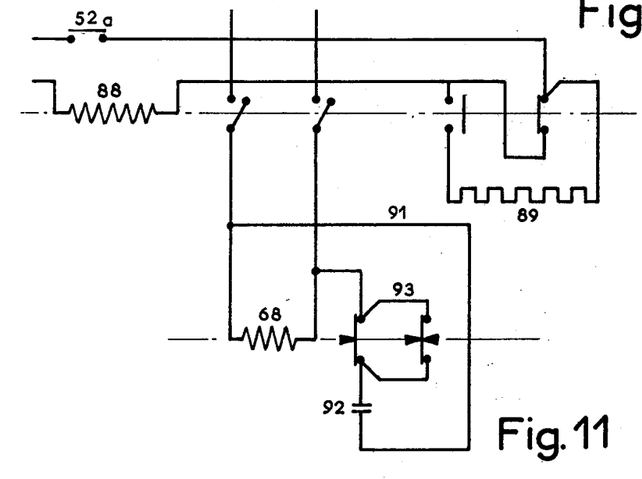
FIGURE 11 shows a diagram of the principle of the circuit of the "normal operation" electromagnet of the control shown in FIGURE 9.

It is a matter of circuits each one having a contactor 88 with its own system of insertion of an economy resistance 89. The electromagnet 69 being fed, its sliding core, at the end of its travel operates on an analagous system 90, for the insertion of an economy resistance. The feeding circuit of the electromagnet 68 comprises a self-feeding system 91, comprising a capacity 92 and delayed contacts 93. By means of the charge accumulated in the capacitance 92 this system allows the electromagnet 69 to remain fed when the microcontact 52a is successively opened and closed by the action of the ratchet system 51 (see FIGURE 6). For the sake of simplification, the microcontacts 52, and 52a have been shown at 52 in FIGURE 6.

In the case of lack of current, the rod 7 tends to fall by gravity due to the reversibility of the nut and bolt system 5. This system, which is very sensitive, can for example be of the type in which the nut portion consists of a series of threaded rollers mounted in a bush and in engagement with the threads of the bolt.

Figure 12:
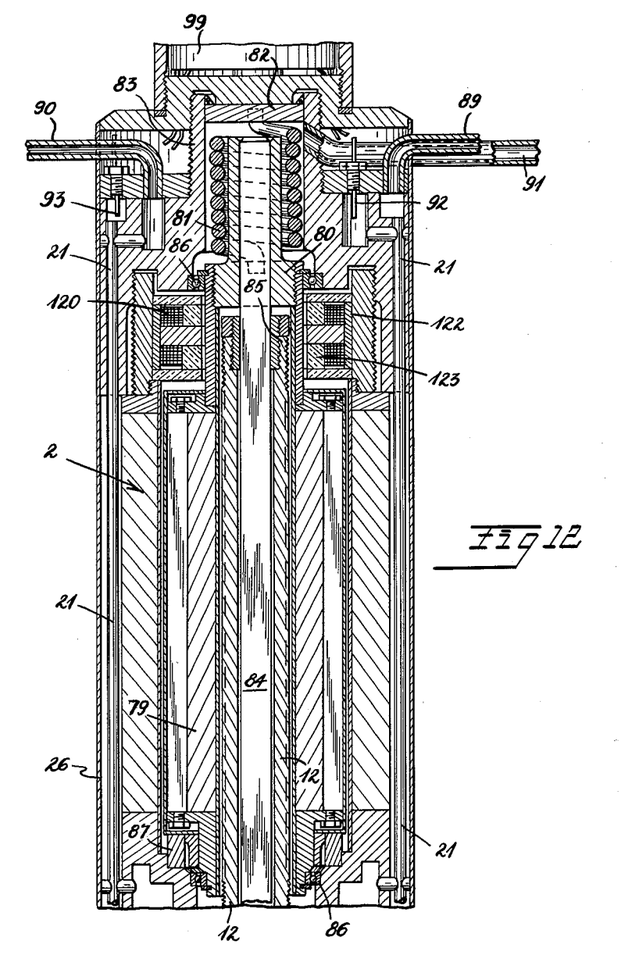
FIGURE 12 is a view in longitudinal section of the safety motor.

The safety device control motor 2 or the safety motor is shown in axial section in FIGURE 12. It has a similar construction to that of the translation motor. In particular its stator has thirty-six coils and its rotor consists of a 6-pole magnet. Its power is about 1 kw. and the torque developed is 1.5 m. kg.; the release torque is about 10 m. kg. The rotor turns through 25° in about one hundredth of a second. The rotor 79 drives a welded bush 80 with which the end of a spring 81 made of "Inconel" for example, is integral. The other end is fixed on a plug 82 which allows the regulation of the tension of the spring. The plug is welded after adjustment on to a flange 83. This bush 80 is integral with a square sectioned shaft 84, sliding in the head 85 of the bolt 12, which has a square opening. When the motor 21 is under tension the rotor turns through 25° and compresses the spring 81. When the feed is broken off, the spring stretches and turns the rotor in the opposite direction. This entails a rotation of the shaft 84 and therefore of the bolt 12 which sets off the rod expulsion system located in the lower part of the assembly of the device and projects the rod into the interior of the reactor. The rotor is retained by two radial ball bearings 86 and a ball stop 87 cooled by the cooling circuit 21. The stator is made in the same way as that of the translation motor 1. The coil assembly similar to that of the translation motor being located in the zone where the temperatures are lower, no cooling rings have been provided. The optical control system is located at 88 and this will be discussed later on.

In the embodiment described by way of example there is only one spring 81. In a modification two springs can be provided if it is necessary to have two directions of rotation in order to uncouple the servo-mechanism into three parts i.e. the motor assembly, the expulsion system and the rod; in this case between the rod and the expulsion system is placed a turning pin device similar to that normally provided in the expulsion system.

The cooling fluid arrives at 89 and leaves at 90. A discharge tube 91 terminates at a point high up in the mechanism; it ensures escape of the air when the assembly is filled for the first time and the eventual evacuation of the radiolysis gases produced during the operation of the reactor. A thermocouple 92 is located at the cooling water inlet, another one 93 being placed at the outlet. These two thermo-couples are connected on to indicating and registering devices of any appropriate type and can actuate audible and optical warning systems for example when the water outlet temperature is too high.

For the sake of homogeneity and to lessen the number of different attached members, the feeding system of the safety motor is considered as that of the translation motor. In particular this system has an assembly such as that shown in FIGURE 6 for the translation motor, but in the case of the safety motor, the motor 50 and the ratchet device 51 are not provided. This motor 50 is replaced by a system of control with two electromagnets which give to the rotor of the commutator 29 an angular displacement of 25° to which an identical angular displacement of the rotor 79 of the safety motor corresponds. A release commutator similar to the commutator 56 serves for coupling and for feeding the commutator similar to the commutator 29; it is also controlled by two electromagnets, such as the electromagnets 68 and 69.

Only one coil in six in the case of one direction of rotation or two coils in six in the case of two directions of rotation of the stator of the safety motor have their ends led out and connected to a ring of the commutator. The latter having thirty-six rings, these last are thus tapped off in parallel in groups of three or two. The operation is comparable to that of the translation motor. In the "holding" position all the safety motors of the installation are tapped off in series and fed at a reduced voltage. Cutting off the feed produces a sliding of the rods. In the "release" position the stator of the safety motor under consideration is fed across a resistance during a transitory period and in the "normal operation" position it is fed at the whole voltage.

Figure 13:
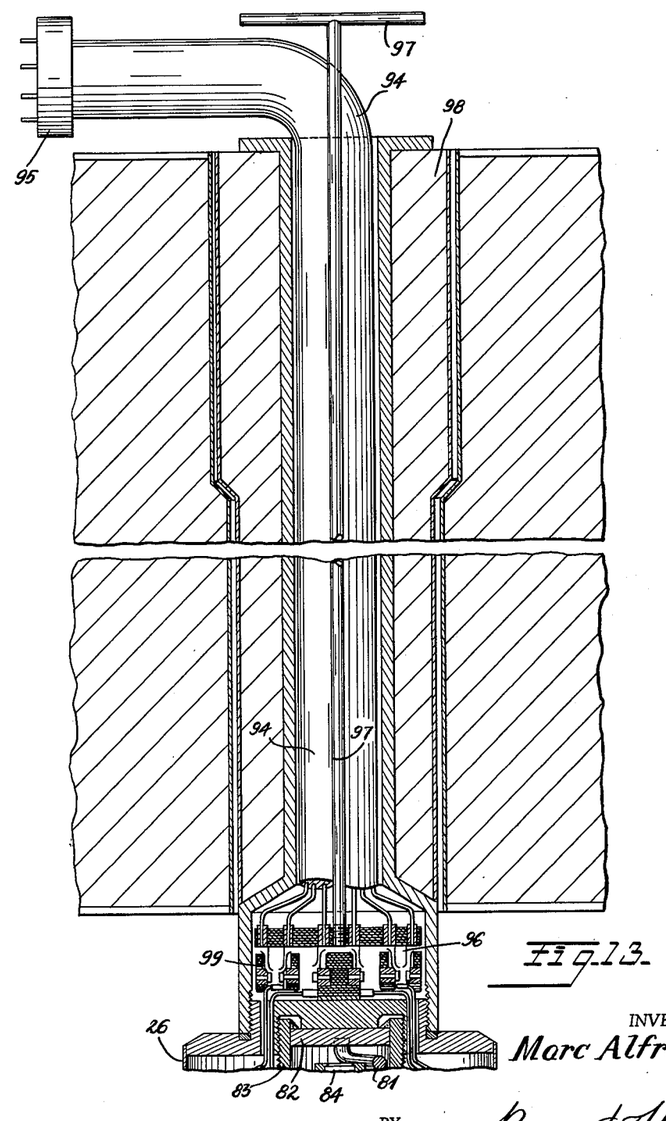
FIGURE 13 is the longitudinal section of the "current contact" part of the device according to the invention.

FIGURE 13 shows the current contact assembly located at the upper end of the device according to the invention. This assembly has a cable 94 with seventy-two conductors ending at its ends in two multi-pin plugs 95 and 96, the plug 96 allowing the pins to be placed in the correct tapping off position. The plug 96 is positioned by rotation, by means of a special spanner 97. A plug 98 encased in lead retains the plug 96 in position and is screwed on to the upper part of the device. This plug is movable and this allows eventual repairs to the contacting assembly. The plug 96 is placed in a socket 99 with seventy-two conductors.

Figure 14:
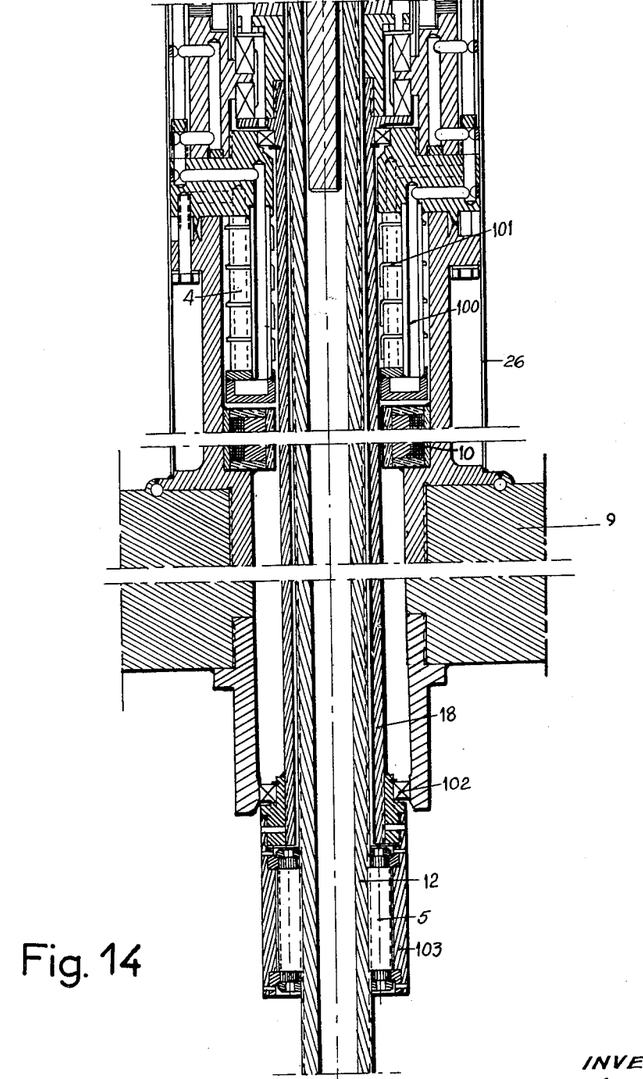
FIGURE 14 is a partial view in longitudinal section of the device according to the invention showing the thermal barrier and the translation control.

The thermal barrier 40 shown in detail in FIGURE 14, which is a longitudinal section of the part of the device according to the invention, which is near the wall 9 of the tank of the reactor. This thermal barrier is a parallel current and counter-current exchanger. Tubes 100 which can be made of stainless steel and can for example have an internal diameter of 6 millimetres and an external diameter of 10 millimetres are held in position by baffle plates 101 pressed and welded on the tubes. In order to avoid thermal stresses on the cover the thermal barrier receives water at the end of the general cooling circuit of the mechanism.

At 5 in FIGURE 14 is shown the nut and bolt system controlling the longitudinal displacement of the rod. The bush 18, integral with the rotor of the translation motor by rotation in the ball bearing 102, effects the rotating movement of the nut 103 which in its turn carries out the longitudinal displacement of the bolt 12. In a preferred embodiment the bolt 12 has a pitch of 10 millimetres and 5 threads of 2 millimetres and the nut is of the type described above.

Figure 15:
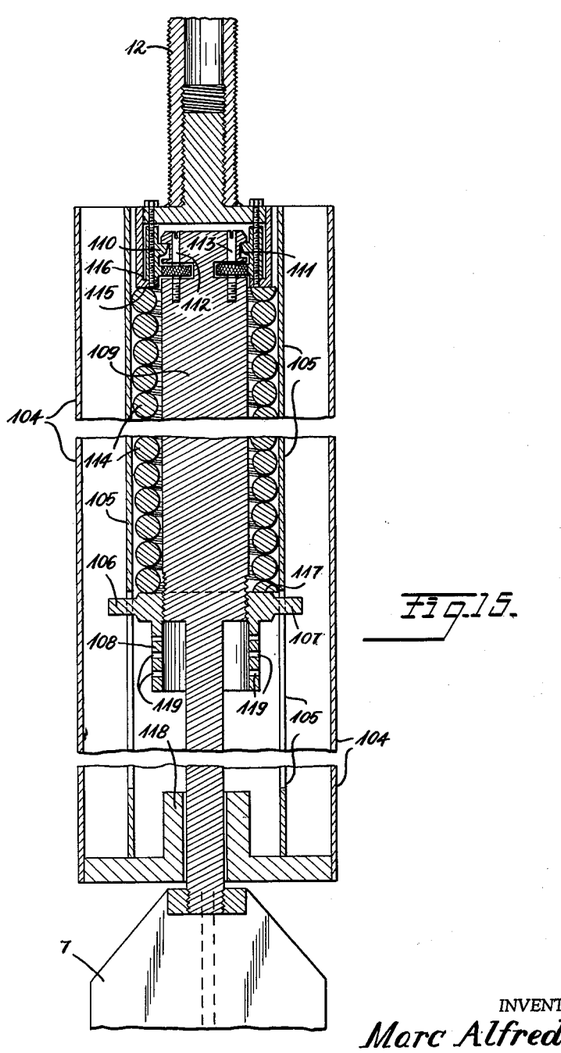
FIGURE 15 shows in longitudinal section the rod expulsion system with spring and turning pin.

FIGURE 15 shows in longitudinal section the spring and pin expulsion mechanism. A guide tube 104 is held in fixed position by any appropriate means with relation to the wall of the tank of the reactor. It encloses a guide 105 in which engage the lugs 106 and 107 of a bush 108 integral with the member 109. The bolt 12 is integral with a pin 110 which engages in a bayonet opening 111 made in the upper part of the member 109. Knurled wheels mounted on ball races and shafts 112 and 113 can be provided to facilitate the relative movement of the pin with reference to the member 109, a movement which is counteracted by the force exerted by the expulsion spring 114. This spring which is compressed when the pin 110 is engaged in the bayonet opening 111 is supported at one side on a shoulder 115 of the bush 116 integral with the pin 110 and the bolt 12 and on the other side on a shoulder 117 of the bush 108. When the spring 81 (see FIGURE 12) actuates the rod 84, the latter communicates its rotary movement to the bolt 12 and to the bush 116. The pin 110 leaves the bayonet location 111 and thus frees the member 109. The spring 114 stretches and downwardly projects the member 109 to which the rod 7 is fixed. At the end of its travel the bush 108 covers the tubular support 118 integral with the tube 104 and this has as its effect the damping of the fall of the rod, the bush 108 having an opening 119 constituting a dash-pot with the support 118.

The measurement of the position of the rod is effected by two different methods used together or separately.

One of these methods consists in a revolution counter 127 mounted on the shaft of the commutator 29 (see FIGURE 6) controlling the rod-translation motor. The other consists in a system putting into action a variable matching transformer whose detector 10 is located below the thermal barrier 4.

The position of the bar at the end of its high or low travel is indicated by an optical control system based equally upon the use of the variable-matching transformer, the detector being located above the safety motor for the end of its high travel and below the translation motor for the end of its low travel. FIGURE 16 shows a diagram of the optical control system at the end of the high travel. It comprises a primary winding 120 (see also FIGURE 12) and secondary winding 121 wound on two cores integral with a yoke 122 of annular shape. Tubular portion 123 made of a non-magnetic material such as bronze protects the windings 120 and 121 against the effects of pressure. The head 85 of the bolt 12 carries a ferro-magnetic member 124, the position of which joined to that of the bar, controls the reluctance of the magnetic circuit of the transformer constituted by the windings 120 and 121. The secondary winding 121 feeds a constant voltage transformer 125, itself connected to a neon lamp 126. This lamp lights up upon an appropriate value of the voltage corresponding to a given value of the reluctance of the variable-matching transformer.

The control device of the bar which forms the object of the present invention constitutes an assembly of which the mechanical part shown diagrammatically in FIGURE 1 can be represented as a whole by the superimposition in the descending order of FIGURES 13, 12, 2, 14, and 15. The assembly is longilinear and characterized by a great resistance to shocks and vibrations. The turning parts i.e. the rotors of the translation and safety motors, have the same longilinear character and are relatively light; thus they have small moments of inertia and therefore respond very quickly.

The device has a very small size in both the longitudinal and transverse directions.

I claim:

1. In a control device for a nuclear reactor having a longitudinally movable control rod; a first reluctance motor having a hollow rotor; a rotary nut coaxial with said first motor adjacent one end thereof and driven by said first motor; a screw extending axially and slidably through the rotor of said first motor and said nut to be axially driven thereby; a second reluctance motor having a hollow rotor, in axial alignment with said first motor and adjacent the end thereof opposite said nut; said screw extending axially and slidably through the hollow rotor of said second motor; said second motor being drivingly but axially slidably connected to said screw to rotate said screw; latch means releasably holding said control rod in a predetermined axial position on one end of said screw for unitary movement therewith when said nut is rotated by said first motor; said latch means including an element fixed to said screw and movable thereby upon rotation of said screw by said second motor, to release said latch and permit said control rod to move axially into said reactor independently of said axial movement of said screw.

2. A device as defined in claim 1 wherein said second motor includes separately rotatable commutators and electromagnetic means for rotationally positioning said commutators.

3. A device as defined in claim 1 in which said screw is provided with a non-circular axial bore; a complementary non-circular rod slidable in said bore; and means drivingly coupling the rotor of said second motor to said rod.

4. A device as defined in claim 1 in which each of said reluctance motors comprises a wound stator and a magnetic rotor having six poles.

5. A device as defined in claim 4 wherein said motors include commutator rings, mounted on the same shaft, for feeding both said motors, a first ring comprising segments equal in number to the stator windings, the other ring having twice the number of segments as said first ring, one segment of each adjacent pair being insulated.

References Cited in the file of this patent

"Proceedings, 1953 Conference on Nuclear Engineering," University of California, Berkeley, September 1953, "Position Control in Sealed Systems," W. H. Esselman et al., pp. D51–D68.

AEC Document, WAPD–BT, Bettis Technical Review, May 1957, pp. 155–163.

AEC Document, WAPD–MRP–67, "Pressurized Water Reactor (PWR) Project," April 1957, p. 32.

"Reactor Handbook," Engineering, vol. 2, 1955, pp. 681–685.